US011838464B2

(12) United States Patent
Nguyen

(10) Patent No.: US 11,838,464 B2
(45) Date of Patent: Dec. 5, 2023

(54) IMAGE FORMING APPARATUS

(71) Applicant: KYOCERA Document Solutions Inc., Osaka (JP)

(72) Inventor: Van Minh Nguyen, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 390 days.

(21) Appl. No.: 17/206,523

(22) Filed: Mar. 19, 2021

(65) Prior Publication Data

US 2021/0306491 A1  Sep. 30, 2021

(30) Foreign Application Priority Data

Mar. 24, 2020  (JP) ................................. 2020-052839

(51) Int. Cl.
*B65H 11/00* (2006.01)
*G03G 21/16* (2006.01)
*H04N 1/00* (2006.01)

(52) U.S. Cl.
CPC ......... *H04N 1/00551* (2013.01); *B65H 11/00* (2013.01); *H04N 1/00557* (2013.01); *B65H 2402/441* (2013.01)

(58) Field of Classification Search
CPC ..... G03G 2221/169; G03G 2221/1687; B65H 2402/441; B65H 2402/45; B65H 11/00; B65H 2601/321; B65H 2601/324; H04N 1/00551; H04N 1/00557
See application file for complete search history.

(56) References Cited

U.S. PATENT DOCUMENTS

| 10,088,797 | B2 * | 10/2018 | Nguyen | ............. G03G 21/1633 |
| 10,928,770 | B2 | 2/2021 | Abe | |
| 2010/0329728 | A1 * | 12/2010 | Irie | .................... G03G 21/1628 399/110 |

FOREIGN PATENT DOCUMENTS

| JP | 2001152724 A | * | 6/2001 |
| JP | 2005099292 A | * | 4/2005 |
| JP | 2019-174690 A | | 10/2019 |

* cited by examiner

*Primary Examiner* — Luis A Gonzalez
(74) *Attorney, Agent, or Firm* — Studebaker & Brackett PC

(57) ABSTRACT

An image forming apparatus includes a casing, an upper cover, a lateral cover and a closing position holding mechanism which holds the lateral cover in a closing position. The closing position holding mechanism includes an engaging part provided in the upper cover and an engaged part provided in the lateral cover. When the upper cover is displaced from the opening position to the closing position in the state where the lateral cover is in the closing position, the engaging part is engaged with the engaged part from an outside on the lateral side of the casing. When the upper cover is displaced from the closing position to the opening position in the state where the lateral cover is in the closing position, the engagement of the engaging part with the engaged part is released as the upper cover is displaced.

11 Claims, 15 Drawing Sheets

IMAGE FORMING APPARATUS

INCORPORATION BY REFERENCE

This application is based on and claims the benefit of priority from Japanese patent application No. 2020-052839 filed on Mar. 24, 2020, which is incorporated by reference in its entirety.

BACKGROUND

The present disclosure relates to an image forming apparatus.

Generally, an image forming apparatus including a top cover covering an upper side of an opening of a casing and a front cover covering a lateral side of the opening is known.

The front cover is displaceable between a closing position where it covers the lateral side of the opening and an opening position where it turns to an lateral outer side of the casing around a turning axis extending in the horizontal direction from the closing position and opens the lateral side of the opening. The top cover is displaceable between a closing position where it covers the upper face of the opening and an opening position where it turns to an outside of the upper face of the casing around a turning axis extending in the horizontal direction from the closing position and opens the upper face of the opening. The front cover is held in the closing position with a hook member, for example. For example, the hook member is protruded on the front cover. When the front cover is displaced to the closing position, the hook member is engaged with a protrusion of the casing, and then the front cover is held in the closing position.

In the conventional image forming apparatus, in a case where an external force is applied to the front cover (the lateral cover), the engagement of the hook member of the lateral cover with the protrusion of the casing is released, and the lateral cover may be opened unexpectedly.

To cope with this problem, it is considered to increase an engagement allowance between the hook member of the lateral cover and the protrusion of the housing.

However, if the engagement allowance between the hook member of the lateral cover and the protrusion of the housing is increased, because the lateral cover is firmly held to the casing in the closing position, there is a problem that it is difficult for a user to open the front cover easily when he performs a maintenance work of the inside of the casing.

SUMMARY

In accordance with an aspect of the present disclosure, an image forming apparatus includes a casing having an opening between an upper face and a lateral face, an upper cover covering an upper side of the opening of the casing and a lateral cover covering a lateral side of the opening.

The lateral cover is supported in a turnable manner around a first turning axis extending in a horizontal direction at a lower end edge portion of the lateral cover, and displaceable between a closing position where the lateral cover covers the lateral side of the opening and an opening position where the lateral cover turns outward on a lateral side of the casing and opens the lateral side of the opening. The upper cover is supported in a turnable manner around a second turning axis extending in a horizontal direction in parallel with the first turning axis at an end edge portion on opposite side to the lateral face of the casing in the opening, and displaceable between a closing position where the upper cover covers the upper side of the opening and an opening position where the upper cover turns outward on an upper side of the casing and opens the upper side of the opening. The upper cover has an upper wall covering the upper side of the opening in the closing position, and a lateral wall extending from an edge portion of the upper wall on a side of the lateral face of the casing along the lateral face of the casing in the closing position and covering a part of the lateral side of the opening. The lateral cover has a fitting wall facing a rear face of the lateral wall of the upper cover when the upper cover is displaced from the opening position to the closing position in a state where the lateral cover is in the closing position. The image forming apparatus further includes a closing position holding mechanism which holds the lateral cover in the closing position. The closing position holding mechanism includes an engaging part provided in the lateral wall of the upper cover and an engaged part provided in the fitting wall of the lateral cover. When the upper cover is displaced from the opening position to the closing position in the state where the lateral cover is in the closing position, the engaging part of the upper cover is engaged with the engaged part of the lateral cover from an outside on the lateral side of the casing. When the upper cover is displaced from the closing position to the opening position in the state where the lateral cover is in the closing position, the engagement of the engaging part with the engaged part is released as the upper cover is displaced.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, one embodiment of the present disclosure will be described. The present disclosure is not limited to the embodiment described below.

Figure 1:
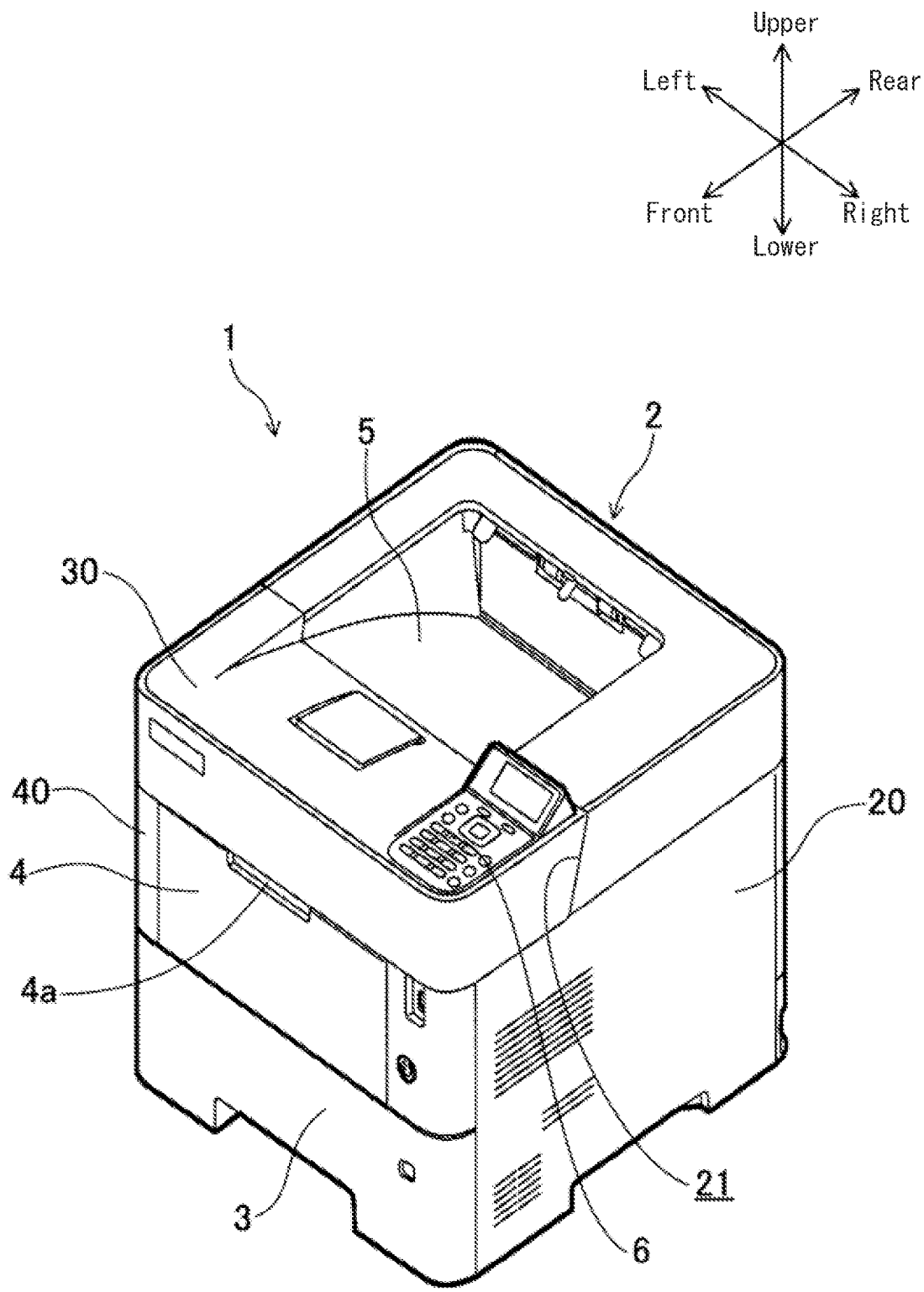
FIG. 1 is an external perspective view showing an image forming apparatus according to the present embodiment, in a state where a manual sheet feeding tray is closed.

<Embodiment> FIG. 1 is an external perspective view showing an image forming apparatus 1 according to the present embodiment. The image forming apparatus 1 is a printer which prints an image data received from an external terminal. In the following description, a front side and a rear side respectively shows a front side and a rear side of the image forming apparatus 1, and a left side and a right side respectively show a left side and a right side of the image forming apparatus 1 viewed from the front side.

The image forming apparatus 1 includes a rectangular box-shaped casing 2 made of resin. In the lower portion of the casing 2, a sheet feeding cassette 3 is attached in a drawable manner forward. In the sheet feeding cassette 3, a bundle of sheets is set.

Figure 2:
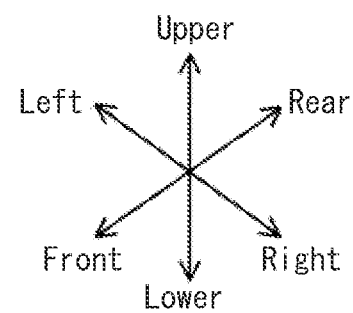
FIG. 2 is an external perspective view showing the image forming apparatus according to the present embodiment, in a state where the manual sheet feeding tray is opened.
Figure 2:
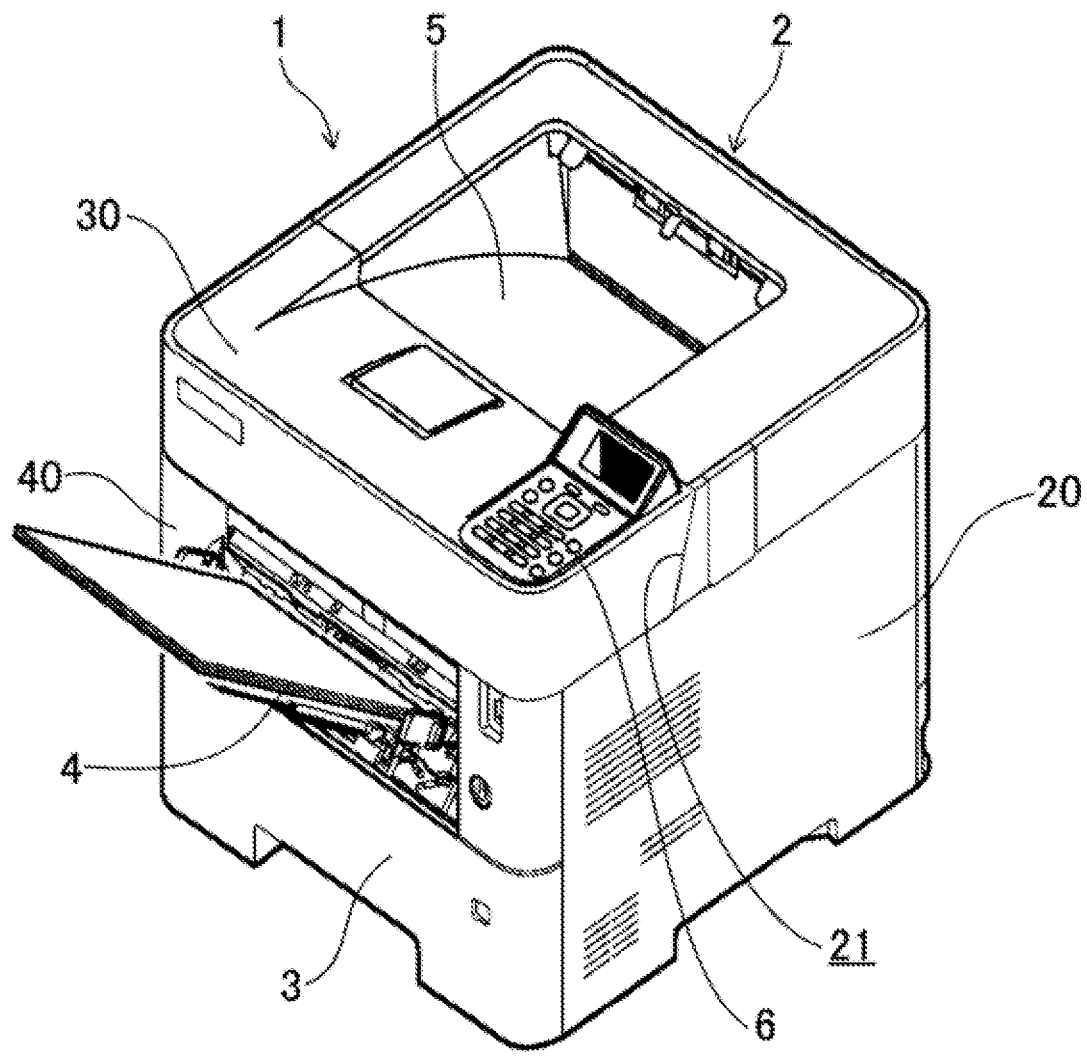

On the front side face of the casing 2, a manual sheet feeding tray 4 is provided in an openable and closable manner. The manual sheet feeding tray 4 is supported in a turnable manner around a turning shaft (not shown) provided in the lower end portion. In a storage state, as shown in FIG. 1, the manual sheet feeding tray 4 is stored in a lateral cover 40 so as to be on the same plane as an upper cover 30 and the lateral cover 40, and forms a part of an external wall of the casing 2. On the other hand, in a usage state, as shown in FIG. 2, the manual sheet feeding tray 4 is disposed so as to be inclined upward toward the front side. In the center portion in the left-and-right direction of the upper end portion of the manual sheet feeding tray 4, a recessed grip part 4a is formed. When a user catches the grip part 4a with his finger and opens the manual sheet feeding tray 4, he can set (place) a sheet on the upper face of the manual sheet feeding tray 4.

In a space above the sheet feeding cassette 3 inside the casing 2, an image forming part and a fixing part (both are not shown) are stored. The image forming part forms a toner image on a recording medium fed from the sheet feeding cassette 3 or the manual sheet feeding tray 4 in an electrophotographic manner. The fixing part heat-fixes the toner image formed on the recording medium. Inside the peripheral portion of the upper face of the casing 2, a discharge tray 5 is provided, on which the recording medium after the fixing processing is completed is discharged. On the front and right corner of the upper face of the casing 2, an operation part 6 is provided, by which the user sets printing conditions and inputs a printing start instruction.

Figure 3:
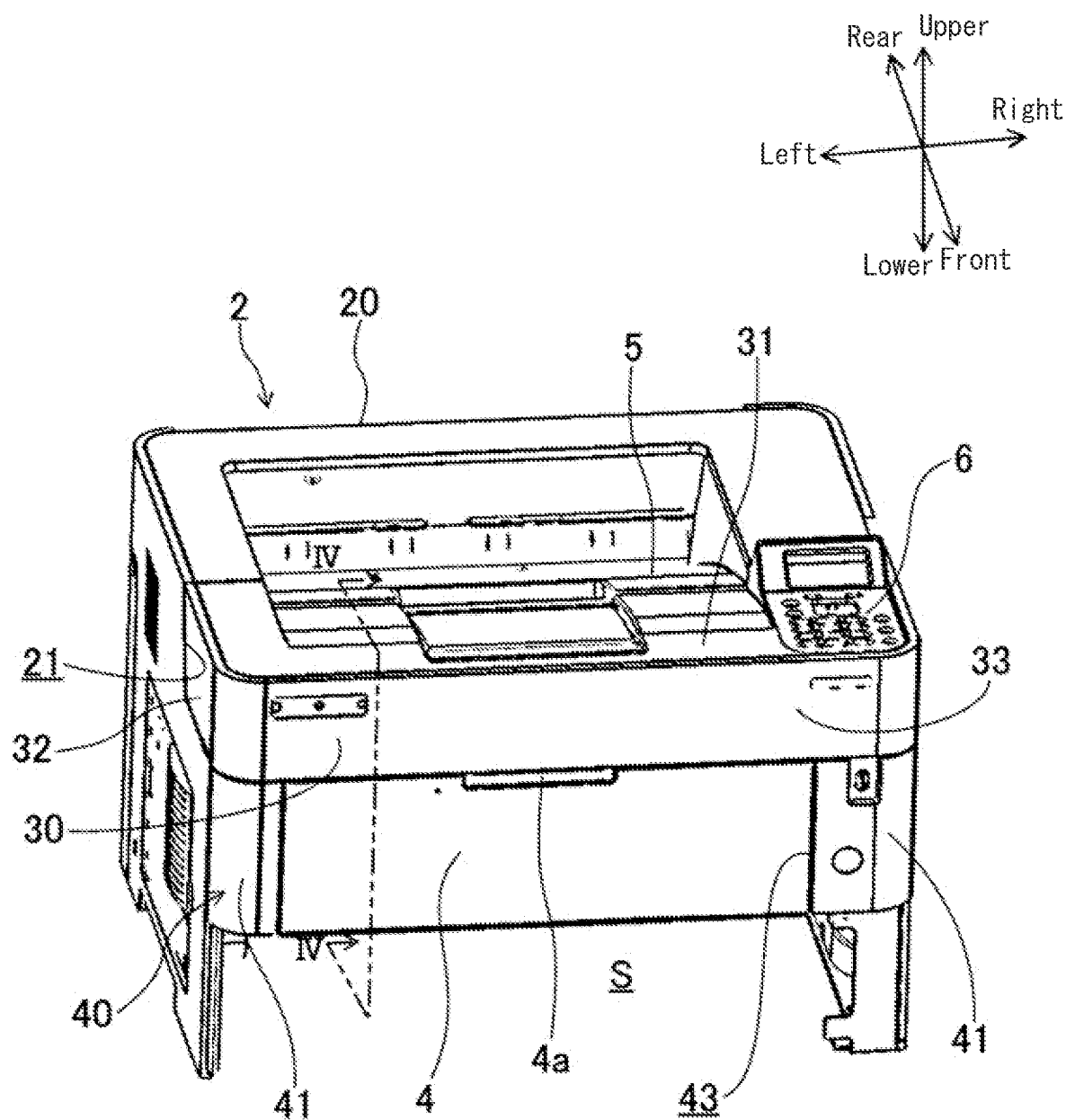
FIG. 3 is an external perspective view showing a casing of the image forming apparatus.

[Structure of the casing 2] As shown in FIG. 3, the casing 2 includes a casing main body 20, a top cover 30 and a front cover 40. The top cover 30 corresponds to the upper cover, and the front cover 40 corresponds to the lateral cover.

The casing main body 20 is an approximately parallelepiped case made of resin. In the lower portion of the casing main body 20, a storage space S is provided, whose front face is opened and to which the sheet feeding cassette 3 is stored in an attachable and detachable manner. In the front end portion of the casing main body 20, an opening 21 is formed above the storage space S. The opening 21 is formed in order for an operator to put in and out his hand for maintenance of the apparatus (such as replacement of consumable supplies and treatment for sheet jamming). The opening 21 is formed between the front side end portion of the upper face and the center portion in the upper-and-lower direction of the front side face of the casing main body 20 (for example, refer to FIG. 8 and the others).

Figure 4:
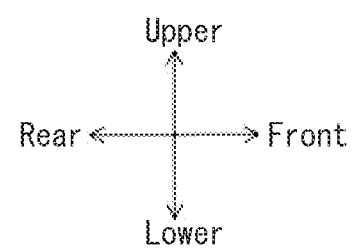
FIG. 4 is a sectional view taken along the line IV-IV in FIG. 3.
Figure 4:
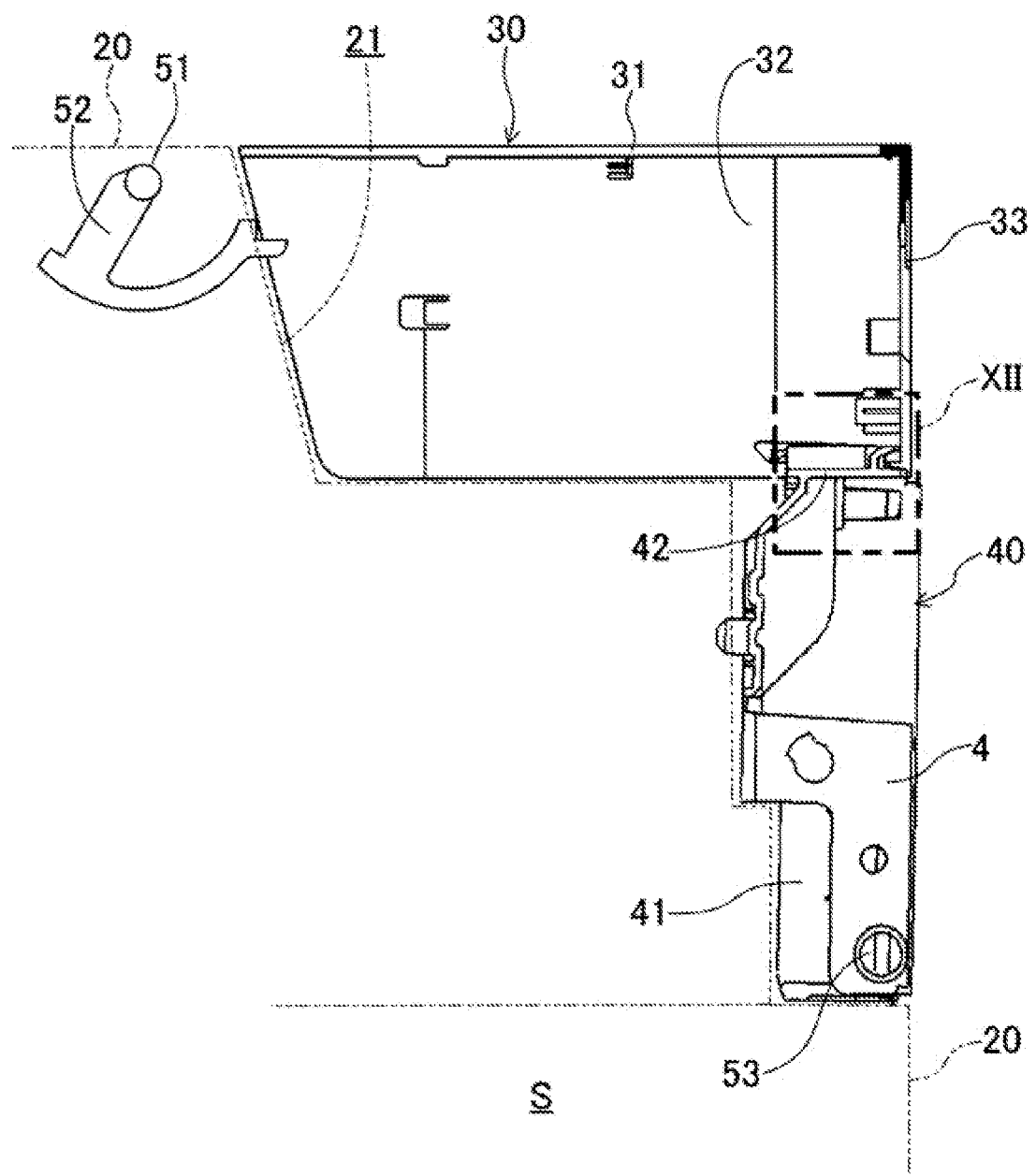

As shown in FIG. 3 and FIG. 4, the opening 21 is covered with the top cover 30 and the front cover 40 in an openable and closable manner. In the following description, unless otherwise mentioned, it is assumed that the top cover 30 and the front cover 40 are in a closing position.

Figure 5:
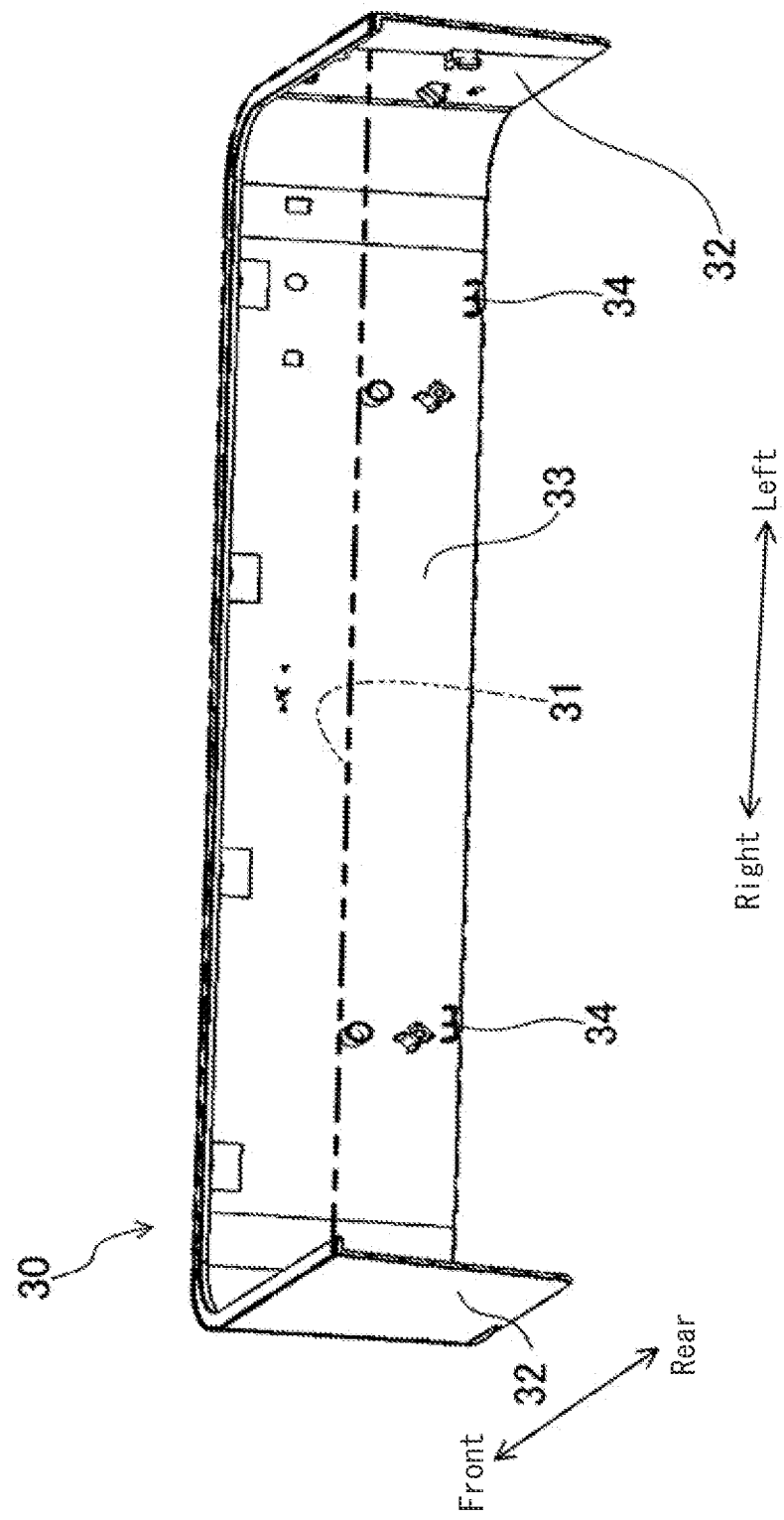
FIG. 5 is an external perspective view showing a top cover, in which a ceiling wall of the top cover is not shown.

[Structure of the top cover 30] The top cover 30 is a cover which covers the opening 21 from the upper side in an openable and closable manner. Specifically, as shown in FIG. 3 to FIG. 5, the top cover 30 is formed into a case-like shape having a ceiling wall 31 (shown by a two-dotted chain line in FIG. 5), a pair of opposite walls 32 and a front side wall 33.

The ceiling wall 31 is formed into a rectangular plate extending in the left-and-right direction along the entire of the front side end portion of the upper face of the casing 2. The opposite walls 32 extend downward from both left and right side edges of the ceiling wall 31. The front side wall 33 extends downward from the front side edge of the ceiling wall 31. Both left and right side edges of the front side wall 33 are connected to the front side edges of the opposite walls 32.

As shown in FIG. 4, the top cover 30 is supported by supporting pins 51 (only the left supporting pin 51 is shown in FIG. 4) protruded from the inner faces of the left and right side walls of the casing main body 20 with turning brackets 52. The top cover 30 is turnable around the supporting pins 51 together with the turning brackets 52. The top cover 30 is displaceable between an opening position where the top cover 30 covers the upper face of the casing main body 20 and a closing position where the top cover 30 is turned upward around the supporting pins 51 from the closing position and opens the opening 21. The supporting pins 51 correspond to a second turning axis extending in the horizontal direction in parallel with a first turning axis at an end edge portion opposite to the side face of the casing 2 in the opening 21.

Figure 6:
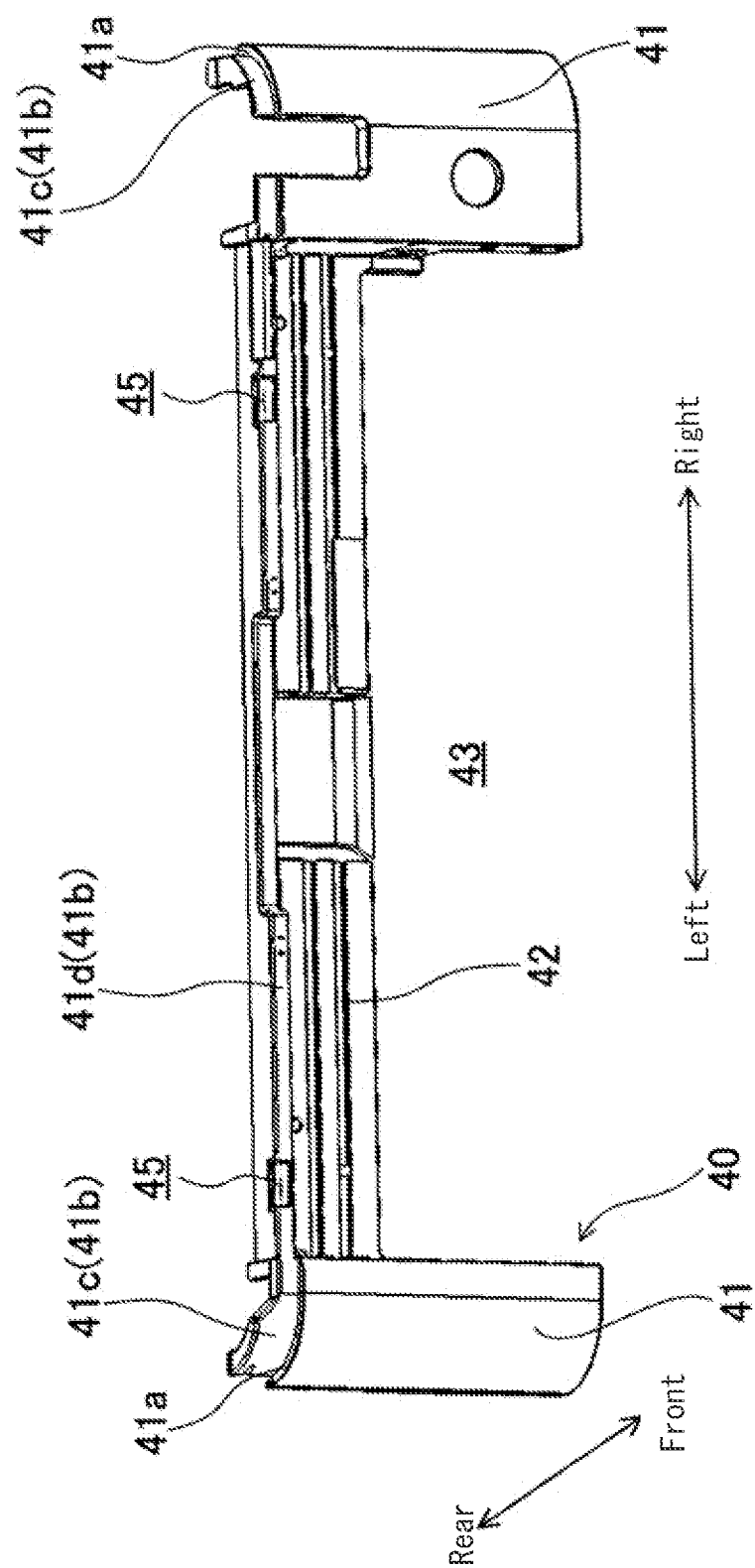
FIG. 6 is an external perspective view showing a front cover.

[Structure of the front cover 40] As shown in FIG. 6, the front cover 40 includes left and right arc-shaped columns 41 and a coupling beam 42. The left and right arc-shaped columns 41 face each other in the left-and-right direction. The coupling beam 42 couples the upper ends of the left and right arc-shaped columns 41 each other. The front cover 40 is formed into an approximately U-shape opened to the lower face when viewed from the front side. In an opened part 43 inside the left and right arc-shaped columns 41 and the coupling beam 42, the manual sheet feeding tray 4 is attached in an openable and closeable manner.

The left and right arc-shaped columns 41 are disposed in the front two corner portions of the casing main body 20 when viewed from the upper side. As shown in FIG. 4, the lower end portions of the left and right arc-shaped columns 41 are supported by supporting pins 53 protruded on the inner face of the casing main body 20 in a turnable manner. The front cover 40 is displaceable between a closing position where the front cover 40 covers the opening 21 of the casing main body 20 from the front side and an opening position where the front cover 40 is turned forward (the front side in FIG. 4) around the supporting pins 53 (the first turning axis) from the closing position and opens the opening 21. Axes of the supporting pins 53 correspond to the first turning axis extending in the horizontal direction at the lower end edge portion of the front cover 40.

As shown in FIG. 6 again, on the upper end portions of the left and right arc-shaped columns 41 and the upper end portion of the coupling beam 42, a fitting wall 41b is provided. The fitting wall 41b is provided via a step face 41a with respect to the left and right arc-shaped columns 41. With the step face 41a, the lower end face of the top cover 30 comes into contact when the top cover 30 is displaced from the opening position to the closing position, and the top cover 30 is kept in a horizontal posture. The fitting wall 41b has arc-shaped portions 41c along the arc-shaped columns 41 and a straight portion 41d along the coupling beam 42. When the top cover 30 is closed in a state where the front cover 40 is closed, the inner face of the top cover 30 comes into contact with the outer side face of the fitting wall 41b. In a state where the top cover 30 and the front cover 40 are closed in the above manner (shown in FIG. 3), the lateral wall of the top cover 30 is overlapped with the fitting wall 41b of the front cover 40 from the outer side. Then, in the state where the top cover 30 and the front cover 40 are closed, the top cover 30 restricts the front cover 40 from being turned.

Figure 7:
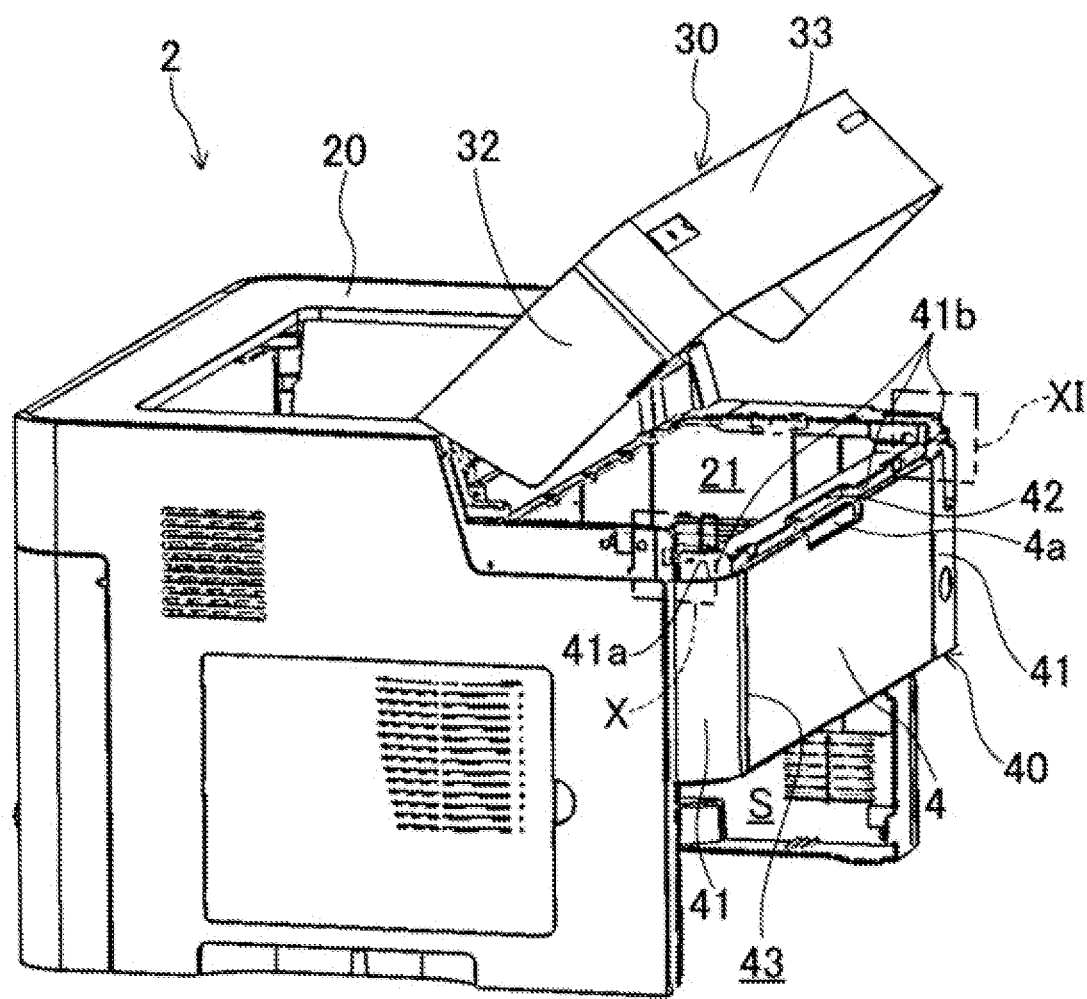
FIG. 7 is an external perspective view showing the casing in a state where the top cover is opened.
Figure 8:
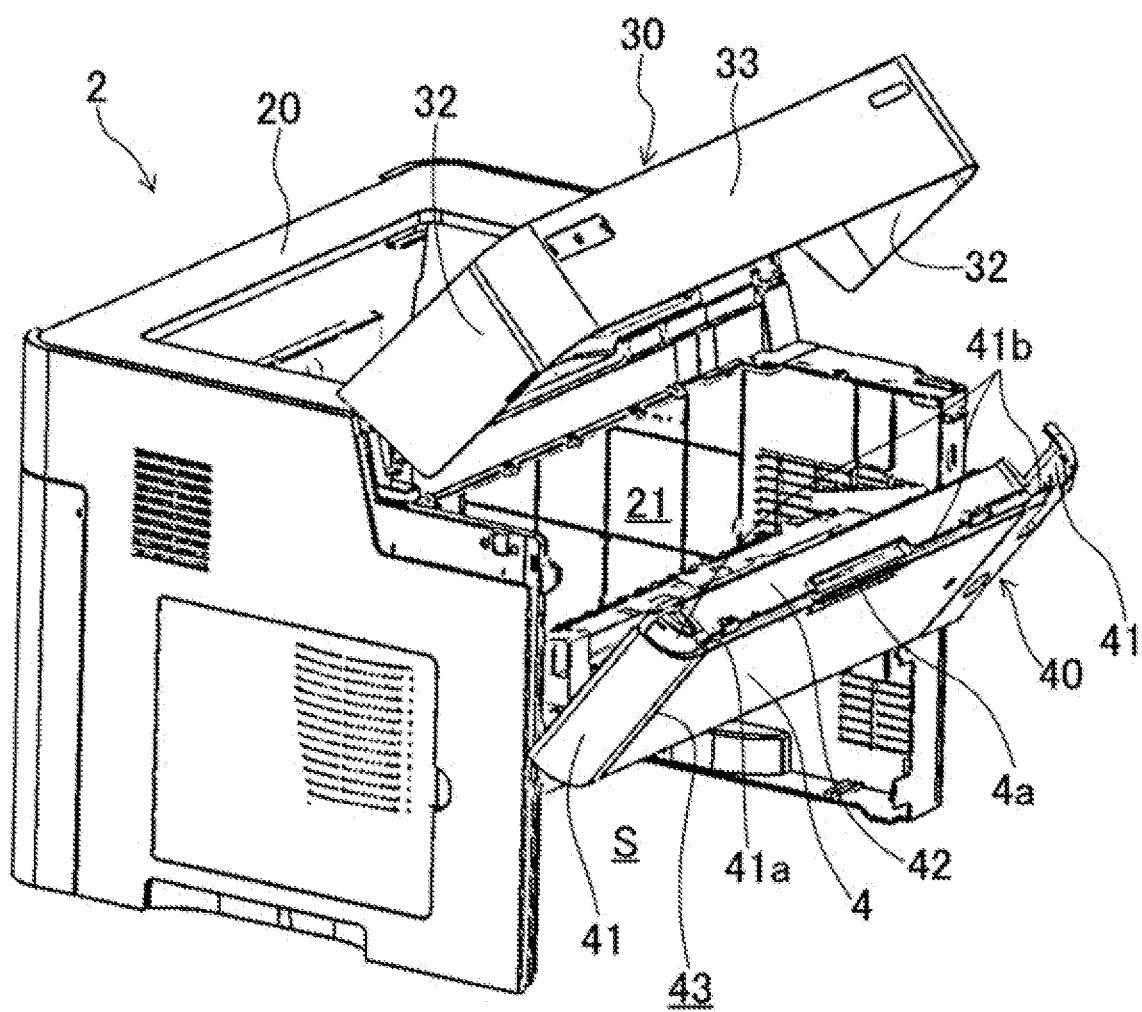
FIG. 8 is an external perspective view showing the casing in a state where the top cover and a front cover are opened.
Figure 9:
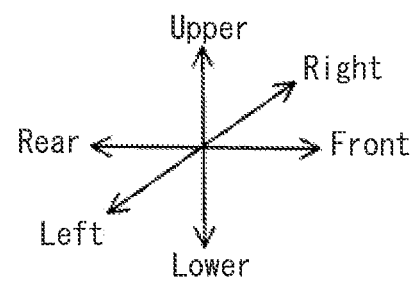
FIG. 9 is an external perspective view showing the casing in a state where only the front cover is opened.
Figure 9:
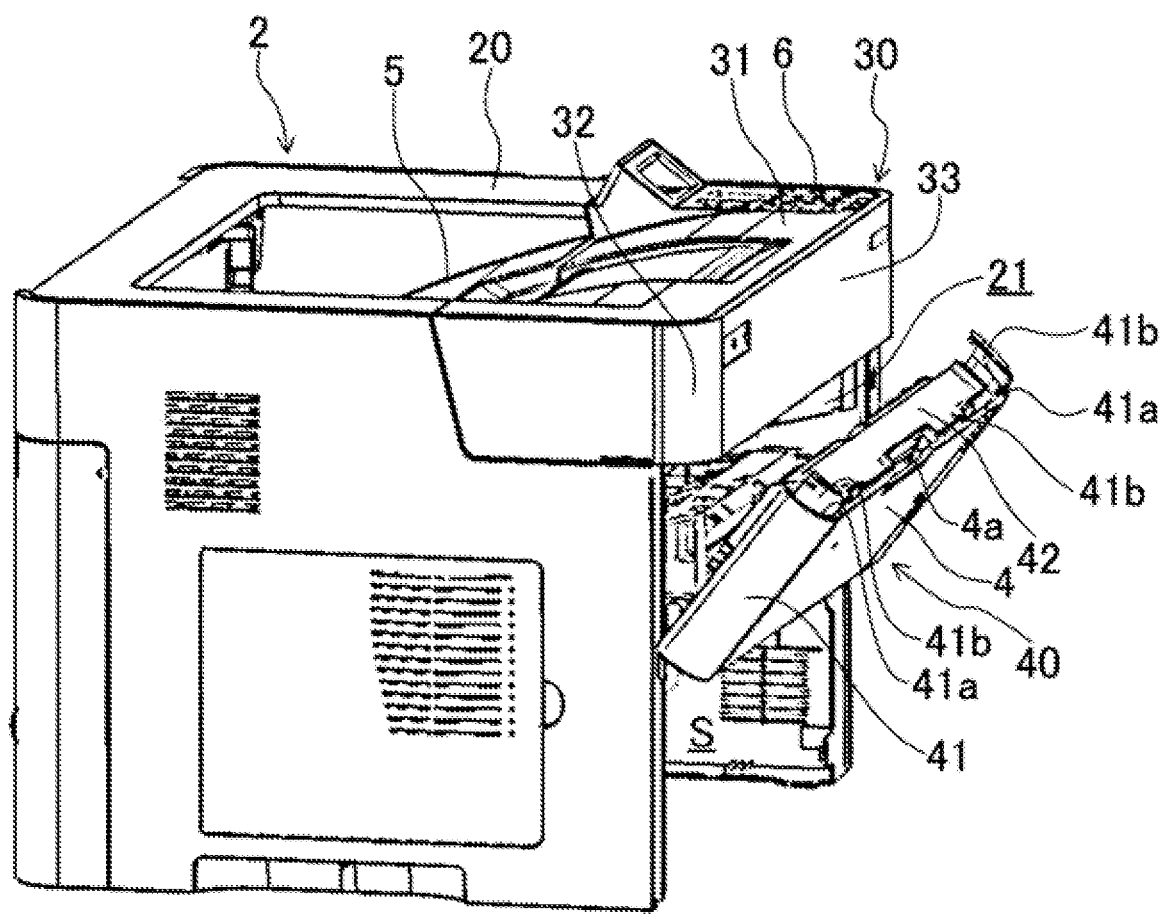

That is, in a usual operation, in order to open the front cover 40, as shown in FIG. 7, the top cover 30 is opened firstly, and then, as shown in FIG. 8, the front cover 40 is opened. By closing the top cover 30 in the state where the top cover 30 and the front cover 40 are opened as shown in FIG. 8, the front cover 40 is only opened as shown in FIG. 9.

In the above described image forming apparatus 1, an engagement accuracy between the fitting wall 41b of the front cover 40 and the inner face of the top cover 30 is preferably set to be lax (a gap is set to be large) in view of formability and easiness in the closing operation of the top cover 30. However, if the engagement accuracy is set to be lax, when the front cover 40 and the top cover 30 are in the closing position, a problem that the restriction force of the top cover 30 for restricting the turning of the front cover 40 is decreased occurs.

[Structures of the first closing position holding mechanism M1 and the second closing position holding mechanism M2] Regarding the problem, the above described image forming apparatus 1 is provided with a first closing position holding mechanism M1 which allows the front cover 40 to be engaged with the casing main body 20 while the front cover 40 kept in the closing position and a second closing position holding mechanism M2 which allows the front cover 40 to be engaged with the top cover 30 while the front cover 40 kept in the closing position. The second closing position holding mechanism M1 corresponds to a closing position holding mechanism in the present disclosure.

Figure 10:
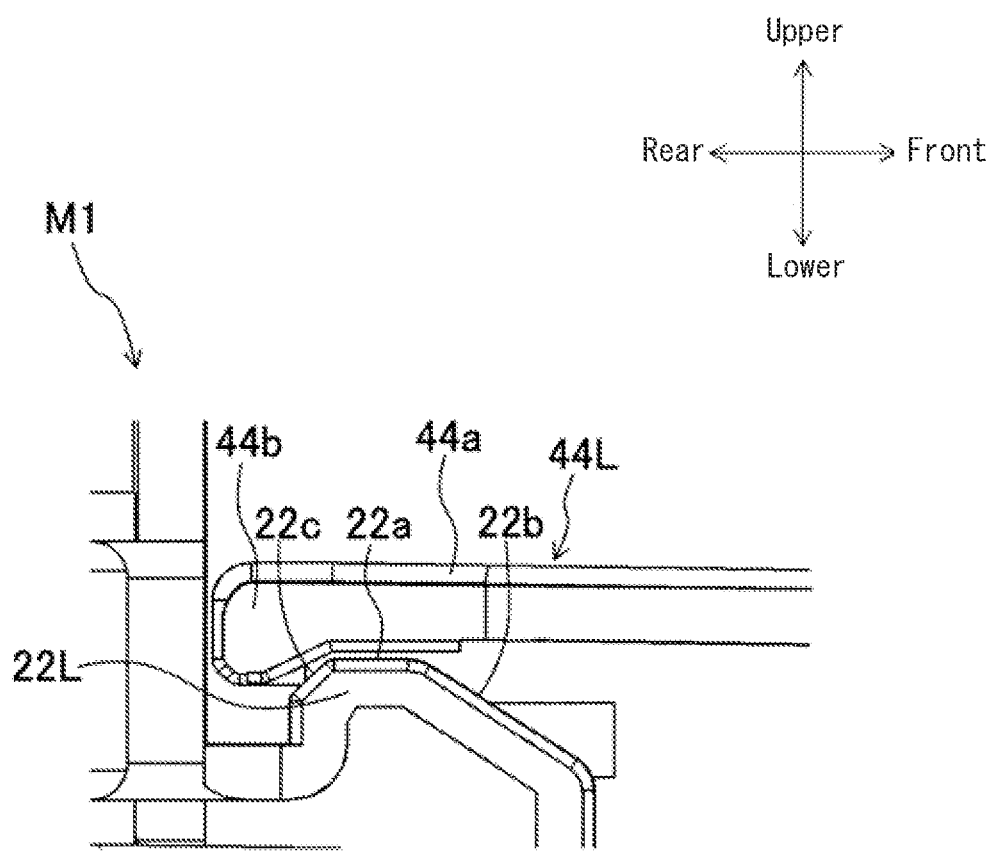
FIG. 10 is a vertical sectional view showing the X part along the front-and-rear direction in FIG. 7.
Figure 11:
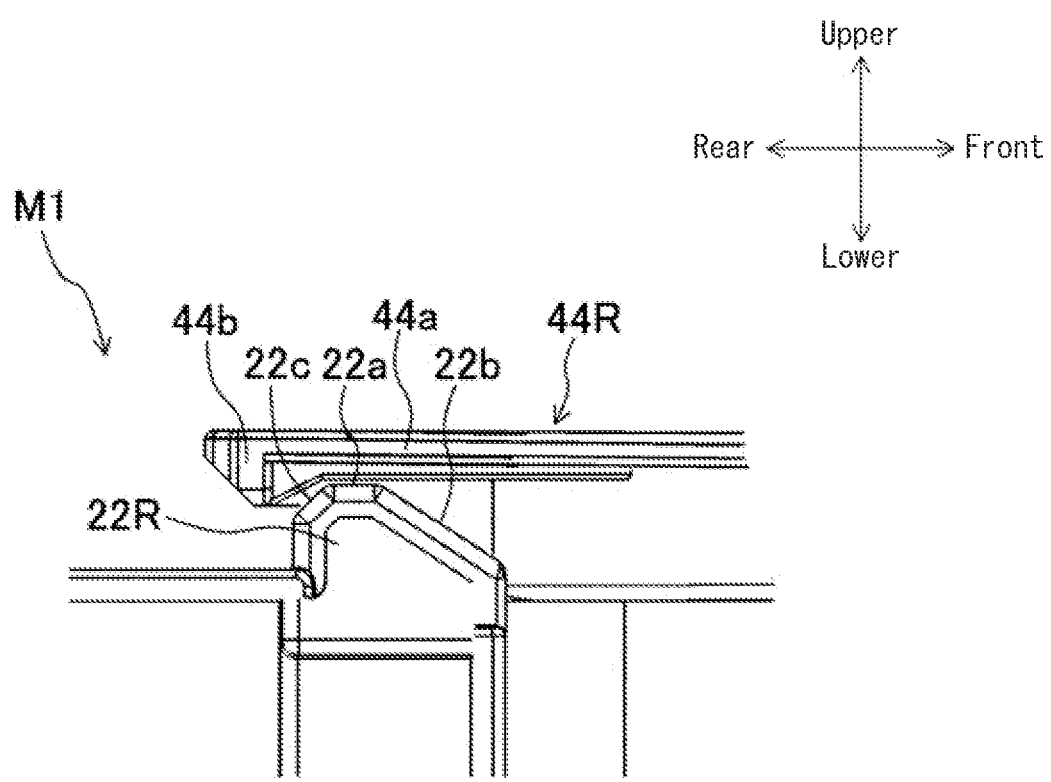
FIG. 11 is a vertical sectional view showing the XI part along the front-and-rear direction in FIG. 7.

With reference to FIG. 7, FIG. 10 and FIG. 11, the structure of the first closing position holding mechanism M1 will be described. The first closing position holding mechanism M1 includes left and right engaged protrusions 22L and 22R provided in the casing main body 20 and left and right engaging hooks 44L and 44R provided in the front cover 40.

As shown in FIG. 10 and FIG. 11, the left and right engaged protrusions 22L and 22R are protruded on the upper end faces of the left and right side walls disposed adjacent to the opening 21 in the casing main body 20. Each of the engaged protrusions 22L and 22R is formed into a trapezoid shape viewed in the left-and-right direction. The engaged protrusions 22L and 22R have slightly different sizes but have almost the same shape. That is, each of the engaged protrusions 22L and 22R has an upper end face 22a, a front inclined face 22b and a rear inclined face 22c which are disposed on the front side and the rear side of the upper end face 22a. The front inclined face 22b has an inclination angle smaller than that of the rear inclined face 22c.

The left and right engaging hooks 44L and 44R have slightly different sizes but have almost the same shape. That is, each of the left and right engaging hooks 44L and 44R has a flexible beam portion 44a protruding rearward from the rear side of the front cover 40 and an engaging claw 44b formed in the tip end portion of the flexible beam portion 44a. The flexible beam portion 44a is flexible in the upper-and-lower direction around its base end portion. The engaging claw 44b has a trapezoid shape in a side view and is protruded downward from the tip end portion of the flexible beam portion 44a.

As the front cover 40 is turned from the opening position to the closing position, the engaging claws 44b of the left and right engaging hooks 44L and 44R are engaged with the engaged protrusions 22L and 22R of the casing main body 20. When the front cover 40 is drawn forward (to the front side in FIG. 10 and FIG. 11) from the closing position with a load larger than a predetermined value, the engaging claws 44b of the left and right engaging hooks 44L and 44R run over the engaged protrusions 22L and 22R, and the engagement of the engaging claws 44b with the engaged protrusions 22L and 22R is released.

[Structure of the second closing position holding mechanism M2] Next, with reference to FIG. 5, FIG. 6 and FIG. 12 to FIG. 15, the structure of the second closing position holding mechanism M2 will be described. The second closing position holding mechanism M2 includes left and right grooves 45 provided in the front cover 40 (refer to FIG. 6 and FIG. 12) and left and right engaging protrusions 34 (refer to FIG. 5 and FIG. 12) provided in the top cover 30 and engaged with the grooves 45.

Figure 13:
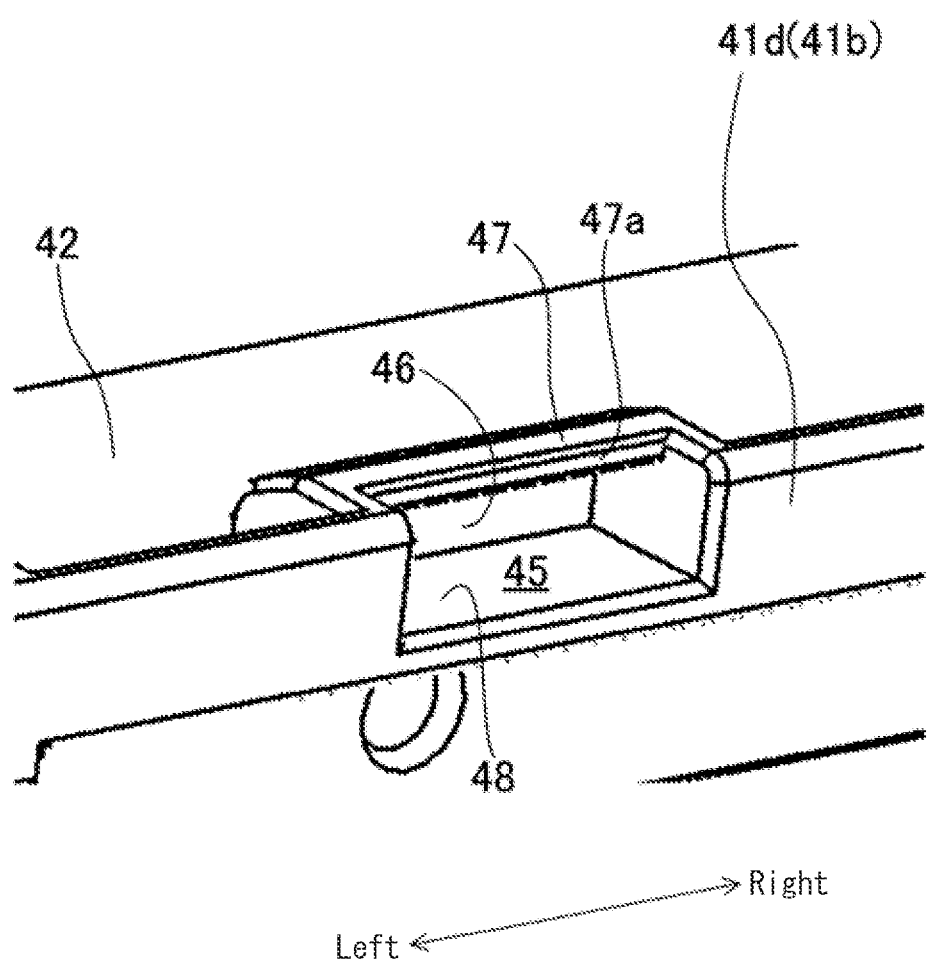
FIG. 13 is an enlarged view showing a groove provided in a coupling beam of the front cover.

As shown in FIG. 6, the left and right grooves 45 are formed in the left and right end portions of the straight portion 41b provided in the coupling beam 42 of the front cover 40, of the fitting wall 41b. As shown in FIG. 13, each groove 45 is formed into a slit groove opened to the front side and long in the left-and-right direction. Each groove 45 has a vertical wall 46, an inclined wall 47 inclined upward from the upper end portion of the vertical wall 46 toward the front side, and a bottom wall 48 on which the vertical wall 46 is stood. The upper wall face 47a of the inclined wall 47 is inclined upward toward the front side. The walls 46 to 48 forming each groove 45 are connected to the fitting wall 41b.

As shown in FIG. 5, the left and right engaging protrusions 34 are protruded from the left and right end portions of the rear face of the front side wall 33 of the top cover 30. The grooves 45 are disposed at positions symmetrical to the grip part 4a of the manual sheet feeding tray 4 in the left-and-right direction. The left and right engaging protrusions 34 have the same size, and the same reference numerals will be used in the following description without distinguishing the left and right engaging protrusions 34.

Figure 14:
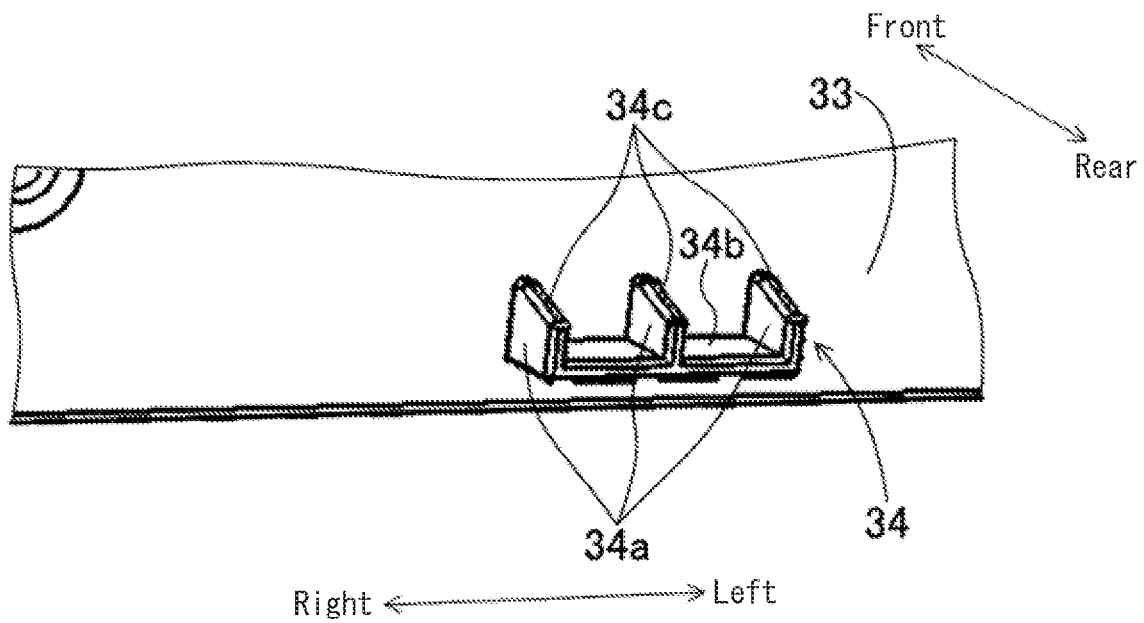
FIG. 14 is an enlarged view showing an engaging protrusion provided on a front side wall of the top cover.

As shown in FIG. 14, each engaging protrusion 34 has three protruding claws 34a disposed side by side in the left-and-right direction via equal intervals and a rectangular coupling plate part 34b coupling the lower end portions of the three protruding claws 34a each other. Each protruding claw 34a is formed into a trapezoid shape whose upper edge is inclined viewed in the left-and-right direction. The upper end face 34c of each protruding claw 34a is inclined downward toward the rear side.

Figure 12:
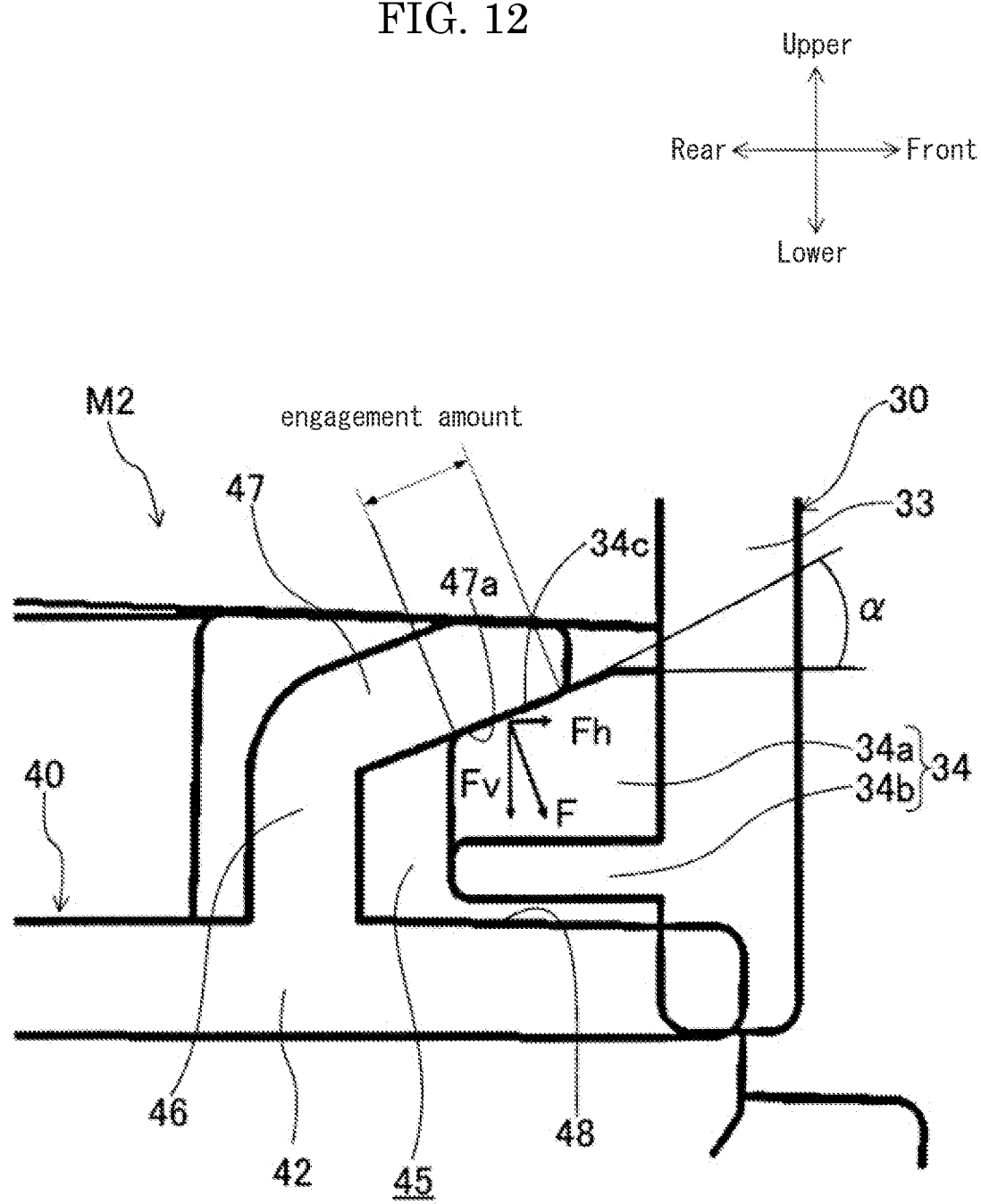
FIG. 12 is an enlarged view showing the XII part in FIG. 4.

As shown in FIG. 12, each engaging protrusion 34 is engaged with the groove 45 with the upper end face 34c coming into contact with the upper wall face 47a of the groove 45. As an inclination angle α of the upper end face 34c of each engaging protrusion 34 (an inclination angle of the upper wall face 47a of the groove 45) is large, an insertion performance of the engaging protrusion 34 to the groove 45 when the top cover 30 is displaced between the opening position and the closing position is increased. However, if the inclination angle α is too large, an engagement allowance of the engaging protrusion 34 with the upper wall face 47a of the groove 45 is decreased, and a position holding force of the top cover 30 to hold the front cover 40 is decreased.

Taking this into consideration, through diligent studies, the inventors have found that by setting the inclination angle α of the upper end face 34c of the engaging protrusion 34 to 20 degrees or more and 30 degrees or less, the position holding force of top cover 30 to hold the front cover 40 can be secured while securing the insertion performance of the engaging protrusion 34 to the groove 45. In the present embodiment, the inclination angle α is set to 25 degrees, for example.

Figure 15:
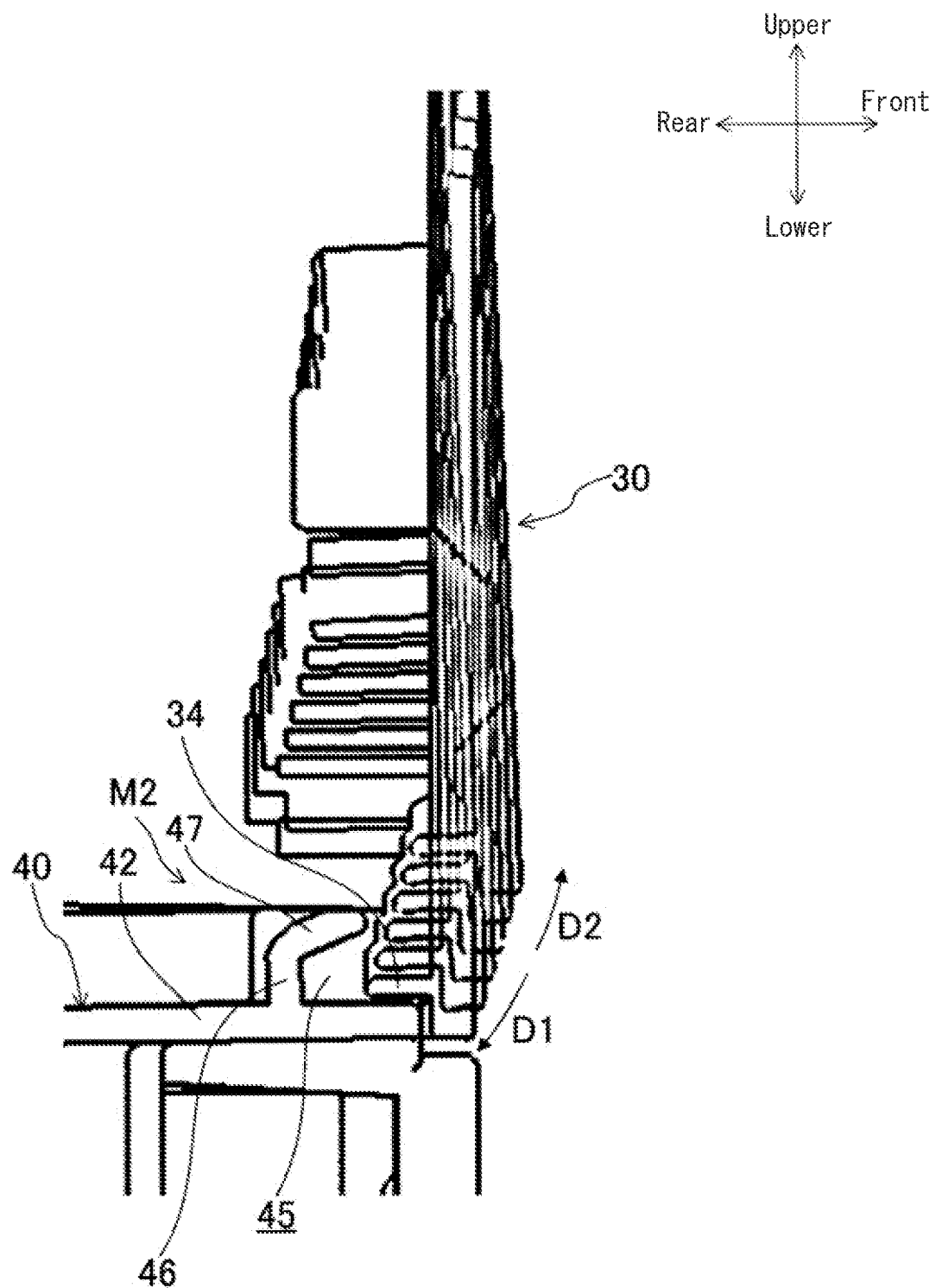
FIG. 15 is a sectional view schematically showing a movement track of the top cover between an opening position and a closing position.

FIG. 15 is a view showing a movement track of the top cover 30 when the top cover 30 is displaced between the opening position and the closing position in a state where the front cover 40 is in the closing position. The arrow D1 in FIG. 15 shows a movement direction of the top cover 30 from the opening position to the closing position, and the arrow D2 shows a movement direction of the top cover 30 from the closing position to the opening position. According to the figure, by displacing the top cover 30 to the closing position, the engaging protrusion 34 is engaged with the groove 45 from the front side without interfering with the inclined wall 47, and by displacing the top cover 30 to the opening position, the engaging protrusion 34 is retracted without interfering with the inclined wall 47 and disengaged with the inclined wall 47.

[Action and effect of the present embodiment] Next, an action and effect of the image forming apparatus in the present embodiment will be described with compared with the conventional image forming apparatus not provided with the second closing position holding mechanism M2.

In the conventional image forming apparatus, a case that an unexpected impact (for example, an impact generated when the manual sheet feeding tray 4 is opened) is applied to the front cover 40 in an opening direction is assumed. In this case, the upper end portion of the front cover 40 presses the inner face of the top cover 30 while inclining in the turning direction. As a result, the top cover 30 is pushed upward, and the front cover 40 may be passed below the lower end portion of the top cover 30, and accidentally opened.

In order to avoid the above problem, it is considerable to increase a protruding amount of the engaging claws 44b of the left and right engaging hooks 44L and 44R and to increase an engagement amount of the left and right engaging hook 44L and 44R with the engaged protrusions 22L and 22R of the first closing position holding mechanism M1. However, in this case, it becomes difficult to disengage the left and right engaging hooks 44L and 44R with the engaged protrusions 22L and 22R when the front cover 40 is opened. This causes the problem that an opening and closing operability of the front cover 40 is decreased.

On the contrary, the image forming apparatus 1 of the present embodiment is provided with the second closing position holding mechanism M2 in addition to the first closing position holding mechanism M1.

The second closing position holding mechanism M2 includes the engaging protrusions 34 provided in the top cover 30 and the grooves 45, as the engaged part, provided in the fitting wall 41b of the front cover 40, as described above. When the top cover 30 is displaced from the opening position to the closing position in a state where the front cover 40 is in the closing position, the engaging protrusions 34 of the top cover 30 are engaged with the grooves 45 of the front cover 40 from the front side (an example of an lateral outer side of the casing), and when the top cover 30 is displaced from the closing position to the opening position in a state where the front cover 40 is in the closing position, the engagement of the engaging protrusions 34 with the grooves 45 is released as the top cover 30 is displaced.

According to the above configuration, when the top cover 30 is displaced from the opening position to the closing position in the state where the front cover 40 is in the closing position (when displaced in the direction of the arrow D1 in FIG. 15), the engaging protrusions 34 of the top cover 30 are engaged with the grooves 45 of the front cover 40 from the front side. Accordingly, even if an unexpected impact toward the front side (toward a side where the front cover is opened) is applied to the front cover 40, because the engaging protrusions 34 of the top cover 30 are engaged with the grooves 45 (an example of an engaged part) of the front cover 40 from the front side, the front cover 40 is not turned forward.

Here, in a case where the second closing position holding mechanism M2 is applied, it is necessary to open the top cover 30 previously when the front cover 40 is opened. Then, it is thought that the opening operation of the front cover 40 becomes complicated. However, when the operator performs the maintenance work through the opening 21, he conventionally opens the top cover 30 firstly, and then opens the front cover 40. Therefore, after the top cover 30 is opened for the maintenance work, the engagement of the engaging protrusions 34 of the top cover 30 with the grooves 45 of the front cover 40 is necessarily released. Accordingly, the operator does not feel difficulty to open the front cover 40 at the maintenance work.

Further, in the present embodiment, the engaging protrusion 34 of the front side wall 33 of the top cover 30 has the upper end face 34c (an example of an engaging face) inclined downward toward the rear side (downward from the outside to the inside of the casing in the horizontal direction) in a state where the top cover 30 is in the closing position. The groove 45 of the front cover 40 has the upper wall face 47a (an example of an engaged face) inclined upward toward the front side (upward from the inside to the outside of the casing in the horizontal direction) in a state where the front cover 40 is in the closing position. Then, in a state where the engaging protrusions 34 of the top cover 30 are engaged with the grooves 45 of the front cover 40, the upper end face 34c of the engaging protrusion 34 comes into contact with the upper wall face 47a of the groove 45 from the lower side.

According to the configuration, if an impact toward the opening side (the side where the front cover 40 is opened, the front side) is applied to the front cover 40, a downward component force Fv (refer to FIG. 12) is acted on the upper end face 34c of the engaging protrusion 34 of the top cover 30 by means of wedge action. Thereby, it becomes possible to press the top cover 30 downward with the component force Fv. Accordingly, when the front cover 40 is applied with an impact in the opening side, it becomes possible to prevent the top cover 30 from being turned upward unexpectedly, and to prevent the front cover 40 from being opened unexpectedly.

Further, the top cover 30 has the pair of opposite walls 32 facing each other in the left-and-right direction and connected to the ceiling wall 31 and the front side wall 33. Then, a rigidity of the top cover 30 can be increased, so that when the top cover 30 is closed, it becomes possible to bring the engaging protrusion 34 into contact with the inclined upper wall face 47a of the inclined wall 47 in the groove 45 surely.

Further, the second closing position holding mechanism M2 is configured such that the engaging protrusions 34 are provided in the left and right end portions of the top cover 30, and the grooves 45 as an engaged part are provided in the fitting wall 41b of the front cover 40 at positions corresponding to the engaging protrusions 34.

According to the configuration, the top cover 30 and the front cover 40 are coupled to each other firmly at the left and right end portions by the engagement of the engaging protrusions 34 with the grooves 45. Accordingly, if the front cover 40 is applied with an impact in the opening side, it becomes possible to prevent the top cover 30 from being turned upward unexpectedly more surely.

Further, the manual sheet feeding tray 4 is attached to the front cover 40. The manual sheet feeding tray 4 is switchable between the storage state where the manual sheet feeding tray 4 forms a part of the external wall face of the casing 2 in a posture along the front cover 40 and the usage state where the sheets are stacked on the manual sheet feeding tray 4 in an inclined posture upward toward the front side (the lateral outer side) from the casing 2.

In the image forming apparatus 1 provided with the above manual sheet feeding tray 4, the front cover 40 is easily opened unexpectedly owing to an impact generated when the manual sheet feeding tray 4 is opened or an impact generated when the sheet is set on the upper face of the manual sheet feeding tray 4. The present disclosure is especially advantageous for the above image forming apparatus.

Further, the manual sheet feeding tray 4 is configured to have the grip part 4a at the upper end portion in the storage state. The grip part 4a is provided in the center portion in the left-and-right direction of the manual sheet feeding tray 4. The second closing position holding mechanism M2 is configured such that the two engaging protrusions 34 are disposed symmetrically with respect to the grip part 4a in the left-and-right direction, and the two grooves 45 are disposed at positions corresponding to the two engaging protrusions 34.

According to the configuration, it becomes possible to couple the top cover 30 and the front cover 40 each other with equal left force and right force. Accordingly, an unbalance state, such as a state where one engaging protrusion 34 is only engaged with the groove 45, is avoid, and it becomes possible to prevent the front cover 40 from being opened unexpectedly as short as possible.

<Other embodiment> In the above embodiment, the image forming apparatus 1 is provided with the first closing position holding mechanism M1 and the second closing position holding mechanism M2 as a mechanism to hold the front cover 40 in the closing position. However, the first closing position holding mechanism M1 is not necessarily required, the first opening position holding mechanism M1 may be eliminated and only the second closing position holding mechanism M2 may be provided.

In the above embodiment, the front cover 40 has been described as an example of the lateral cover, but the present disclosure is not limited thereto. The side face may be a rear cover positioned on the rear side of the casing main body 20 or lateral covers positioned on the left and right sides.

In the above embodiment, the front cover 40 is provided with the groove 45 as an engaged portion, and the top cover 30 is provided with the engaging protrusion 34 as an engaged portion, but the present disclosure is not limited thereto. For example, a protrusion may be provided as an engaged part of the front cover 40, and a groove may be provided as an engaging part of the top cover 30.

While the above embodiments describe an example where the image forming apparatus 1 is a printer, the present disclosure it not limited to the embodiments. The image forming apparatus 1 may be a facsimile, a copying machine, or a multifunctional peripheral (MFP).

As described above, the present disclosure is useful for an image forming apparatus, and particularly useful for a copying machine, a facsimile, a printer, a multifunctional peripheral (MFP), and the like.

The present disclosure has been described with respect to specific embodiments, the present disclosure is not limited to the above embodiments. The above embodiment can be modified by those skilled in the art without departing from the scope and sprit of the present disclosure.

The invention claimed is:
1. An image forming apparatus comprising:
a casing having an opening between an upper face and a lateral face;
an upper cover covering an upper side of the opening of the casing; and
a lateral cover covering a lateral side of the opening, wherein
the lateral cover is provided with a manual sheet feeding tray,
the manual sheet feeding tray is switchable between a storage state where the manual sheet feeding tray forms a part of an external wall of the casing in a posture along the lateral cover and a usage state where a sheet is placed on the manual sheet feeding tray in a posture inclined upward toward the outside on the lateral side of the casing,
the lateral cover is supported in a turnable manner around a first turning axis extending in a horizontal direction at a lower end edge portion of the lateral cover, and displaceable between a closing position where the lateral cover covers the lateral side of the opening and an opening position where the lateral cover turns outward on a lateral side of the casing and opens the lateral side of the opening,
the upper cover is supported in a turnable manner around a second turning axis extending in a horizontal direction in parallel with the first turning axis at an end edge portion on opposite side to the lateral face of the casing in the opening, and displaceable between a closing position where the upper cover covers the upper side of the opening and an opening position where the upper cover turns outward on an upper side of the casing and opens the upper side of the opening,
the upper cover has an upper wall covering the upper side of the opening in the closing position, and a lateral wall extending from an edge portion of the upper wall on a side of the lateral face of the casing along the lateral face of the casing in the closing position and covering a part of the lateral side of the opening,
the lateral cover has a fitting wall facing a rear face of the lateral wall of the upper cover when the upper cover is displaced from the opening position to the closing position in a state where the lateral cover is in the closing position, and the image forming apparatus further comprises a closing position holding mechanism which holds the lateral cover in the closing position, wherein the closing position holding mechanism includes an engaging part provided in the lateral wall of the upper cover and an engaged part provided in the fitting wall of the lateral cover, when the upper cover is displaced from the opening position to the closing position in the state where the lateral cover is in the closing position, the engaging part of the upper cover is engaged with the engaged part of the lateral cover from an outside on the lateral side of the casing, and when the upper cover is displaced from the closing position to the opening position in the state where the lateral cover is in the closing position, the engagement of the engaging part with the engaged part is released as the upper cover is displaced.

2. The image forming apparatus according to claim 1, wherein the engaging part has an engaging face inclined downward toward an inside from an outside of the casing in the horizontal direction in a state where the upper cover is in the closing position, the engaged part has an engaged face inclined upward toward the inside to the outside of the casing in the horizontal direction in the state where the lateral cover is in the closing position, and the engaging face of the engaging part comes into contact with the engaged face of the engaged part from a lower side in a state where the engaging part is engaged with the engaged part.

3. The image forming apparatus according to claim 2, wherein an inclination angle of the engaged face with respect to a horizontal plane in the state where the upper cover is in the closing position is 20 degrees or more and 30 degrees or less.

4. The image forming apparatus according to claim 1, wherein the engaging part has a plurality of protruding claws disposed side by side via equal intervals in the horizontal direction and a coupling plate coupling lower end portions of the plurality of protruding claws, the engaging face is formed on the plurality of protruding claws.

5. The image forming apparatus according to claim 1, wherein the upper cover further includes a pair of opposite walls facing in a direction along the second turning axis and coupled to the upper wall and the lateral wall.

6. The image forming apparatus according to claim 1, wherein the closing position holding mechanism is configured such that the engaging part is provided in the upper cover at each of end portions in a direction along the first turning axis, and the engaged part is provided in the fitting wall of the lateral cover at position corresponding to the engaging part.

7. The image forming apparatus according to claim 1, wherein the manual sheet feeding tray is configured to have a grip part at an upper end portion in the storage state, the grip part is provided in a center portion in a direction along the first turning axis, the manual sheet feeding tray is supported by the casing in a turnable manner around a lower end portion, and by turning the manual sheet feeding tray to the outside on the lateral side of the casing around the lower end portion with the grip part, the manual sheet feeding tray is switched to the usage state, the closing position holding mechanism include a plurality of the engaging parts and a plurality of the engaged parts, the engaging parts are disposed symmetrically with respect to the grip part in a direction along the first turning axis, and the engaged parts are disposed at positions corresponding to the engaged parts.

8. The image forming apparatus according to claim 1, further comprising another opening position holding mechanism which engages the lateral cover with the casing with keeping the lateral cover in the closing position.

9. An image forming apparatus comprising:

a casing having an opening between an upper face and a lateral face;

an upper cover covering an upper side of the opening of the casing; and a lateral cover covering a lateral side of the opening, wherein the lateral cover is supported in a turnable manner around a first turning axis extending in a horizontal direction at a lower end edge portion of the lateral cover, and displaceable between a closing position where the lateral cover covers the lateral side of the opening and an opening position where the lateral cover turns outward on a lateral side of the casing and opens the lateral side of the opening, the upper cover is supported in a turnable manner around a second turning axis extending in a horizontal direction in parallel with the first turning axis at an end edge portion on opposite side to the lateral face of the casing in the opening, and displaceable between a closing position where the upper cover covers the upper side of the opening and an opening position where the upper cover turns outward on an upper side of the casing and opens the upper side of the opening, the upper cover has an upper wall covering the upper side of the opening in the closing position, and a lateral wall extending from an edge portion of the upper wall on a side of the lateral face of the casing along the lateral face of the casing in the closing position and covering a part of the lateral side of the opening, the lateral cover has a fitting wall facing a rear face of the lateral wall of the upper cover when the upper cover is displaced from the opening position to the closing position in a state where the lateral cover is in the closing position, and the image forming apparatus further comprises a closing position holding mechanism which holds the lateral cover in the closing position, wherein the closing position holding mechanism includes an engaging part provided in the lateral wall of the upper cover and an engaged part provided in the fitting wall of the lateral cover, when the upper cover is displaced from the opening position to the closing position in the state where the lateral cover is in the closing position, the engaging part of the upper cover is engaged with the engaged part of the lateral cover from an outside on the lateral side of the casing, and when the upper cover is displaced from the closing position to the opening position in the state where the lateral cover is in the closing position, the engagement of the engaging part with the engaged part is released as the upper cover is displaced, and the engaging part has an engaging face inclined downward toward an inside from an outside of the casing in the horizontal direction in a state where the upper cover is in the closing position, the engaged part has an engaged face inclined upward toward the inside to the outside of the casing in the horizontal direction in the state where the lateral cover is in the closing position, and the engaging face of the engaging part comes into contact with the engaged face of the engaged part from a lower side in a state where the engaging part is engaged with the engaged part.

10. The image forming apparatus according to claim 9, wherein
an inclination angle of the engaged face with respect to a horizontal plane in the state where the upper cover is in the closing position is 20 degrees or more and 30 degrees or less.

11. An image forming apparatus comprising:
a casing having an opening between an upper face and a lateral face;
an upper cover covering an upper side of the opening of the casing; and
a lateral cover covering a lateral side of the opening, wherein
the lateral cover is supported in a turnable manner around a first turning axis extending in a horizontal direction at a lower end edge portion of the lateral cover, and displaceable between a closing position where the lateral cover covers the lateral side of the opening and an opening position where the lateral cover turns outward on a lateral side of the casing and opens the lateral side of the opening,
the upper cover is supported in a turnable manner around a second turning axis extending in a horizontal direction in parallel with the first turning axis at an end edge portion on opposite side to the lateral face of the casing in the opening, and displaceable between a closing position where the upper cover covers the upper side of the opening and an opening position where the upper cover turns outward on an upper side of the casing and opens the upper side of the opening,
the upper cover has an upper wall covering the upper side of the opening in the closing position, and a lateral wall extending from an edge portion of the upper wall on a side of the lateral face of the casing along the lateral face of the casing in the closing position and covering a part of the lateral side of the opening,
the lateral cover has a fitting wall facing a rear face of the lateral wall of the upper cover when the upper cover is displaced from the opening position to the closing position in a state where the lateral cover is in the closing position, and
the image forming apparatus further comprises a closing position holding mechanism which holds the lateral cover in the closing position, wherein
the closing position holding mechanism includes an engaging part provided in the lateral wall of the upper cover and an engaged part provided in the fitting wall of the lateral cover,
when the upper cover is displaced from the opening position to the closing position in the state where the lateral cover is in the closing position, the engaging part of the upper cover is engaged with the engaged part of the lateral cover from an outside on the lateral side of the casing, and
when the upper cover is displaced from the closing position to the opening position in the state where the lateral cover is in the closing position, the engagement of the engaging part with the engaged part is released as the upper cover is displaced, and
the image forming apparatus further comprises another opening position holding mechanism which engages the lateral cover with the casing with keeping the lateral cover in the closing position.

* * * * *